Patented Oct. 17, 1922.

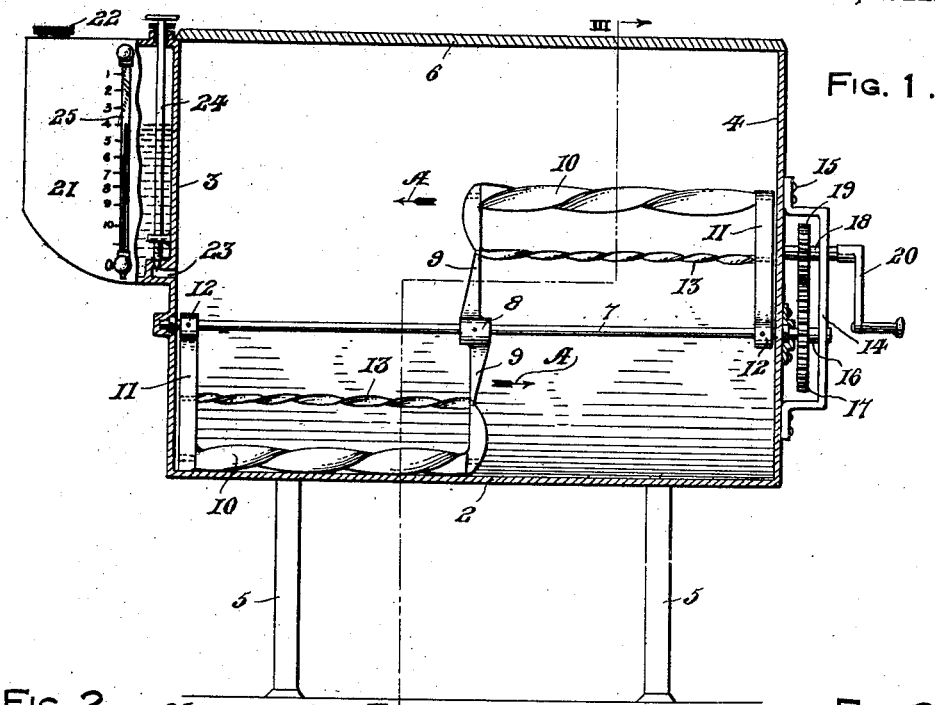
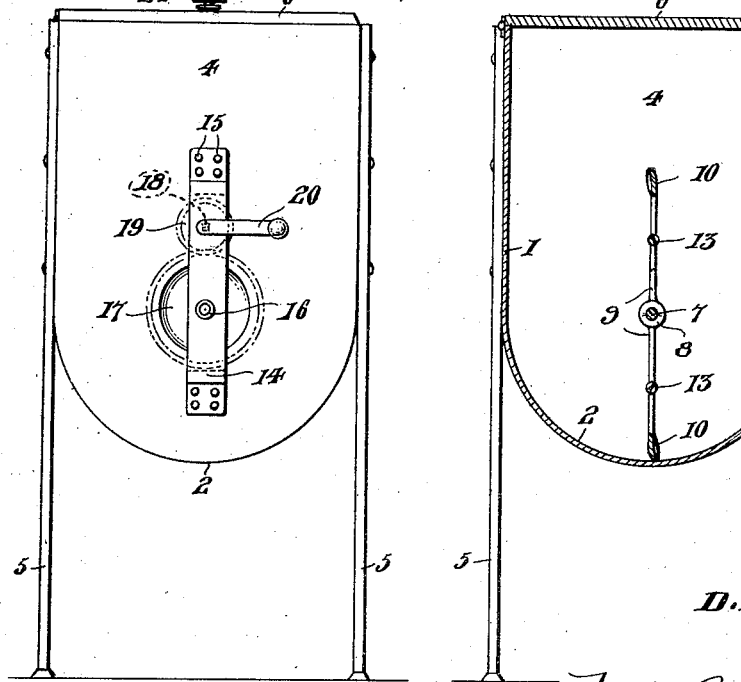
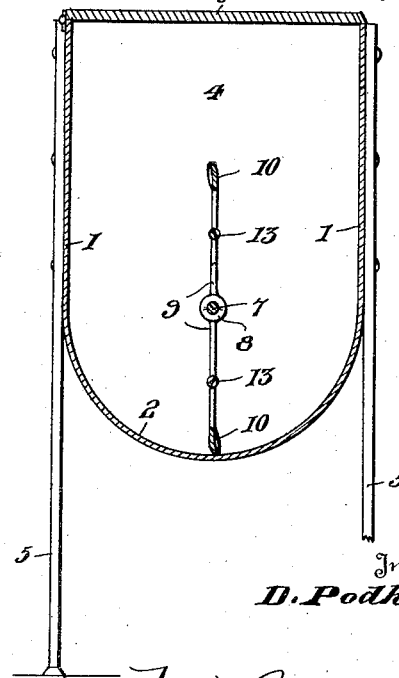

1,432,358

UNITED STATES PATENT OFFICE.

DMYTRO PODHAJNY, OF ALGOMA, WEST VIRGINIA, ASSIGNOR OF ONE-HALF TO OSCAR ROTH, OF NORTHFORK, WEST VIRGINIA.

DOUGH MIXER.

Application filed November 23, 1921. Serial No. 517,227.

*To all whom it may concern:*

Be it known that I, DMYTRO PODHAJNY, a citizen of Ukraine, residing at Algoma, in the county of McDowell and State of West Virginia, have invented certain new and useful Improvements in Dough Mixers, of which the following is a specification.

This invention relates to certain new and useful improvements in dough mixers and has particular reference to a mechanical mixer embodying a rotatable shaft carrying screw blades positioned at opposite sides thereof and laterally offset for the purpose of mixing the dough and causing the same to travel in a substantially circuitous path within the mixer receptacle.

A further object of the invention embodies in a dough mixer a fluid receptacle associated therewith and manually controlled for delivering the desired quantity of liquid to the receptacle during the mixing operation of the dough.

With the above general objects in view and others that will appear as the nature of the invention is better understood, the same consists of the novel form, combination and arrangement of parts hereinafter more fully described, shown in the accompanying drawing and claimed.

In the drawing, wherein like reference characters designate corresponding parts throughout the several views, Figure 1 is a longitudinal sectional view of a dough mixer constructed in accordance with the present invention, showing the mixing blades, operating means therefor and the manually controlled fluid receptacle associated with the mixer, Figure 2 is an end elevational view of the device showing the drive gearing for the mixing blades, and Figure 3 is a vertical cross sectional view taken on line III—III of Fig. 1 showing the oppositely positioned mixing blades carried by the operating shaft.

Referring more in detail to the accompanying drawing there is illustrated a dough mixer embodying a receptacle having side walls 1 and a curved bottom wall 2, and walls 3 and 4 and supporting legs 5 secured to the opposite side walls as shown in Figs. 2 and 3, while a hinged cover 6 closes the upper end of the receptacle.

The mixing apparatus within the receptacle embodies a longitudinally extending shaft 7 journaled at its ends in the end walls 3 and 4 with the mixing blades secured thereto. The mixing blades embody a hub 8 centrally secured to the rotatable shaft 7 and carrying radial arms 9 with oppositely directed spiral blades 10 journaled in the outer ends thereof, and alternately moving in proximity of the curved bottom wall 2 of the receptacle, bracket arms 11 secured to the shaft 7 adjacent the ends thereof as at 12 constituting journal bearings for the outer ends of the spiral blades 10. Smaller spiral blades 13 are journaled in the arms 9 and 11 and substantially midway between the rotatable shaft 7 and the blades 10.

The operating mechanism for the mixing blades, and for rotating the shaft 7 embodies a strap bearing 14 secured as at 15 to the outer face of the end wall 4 of the receptacle, a stub shaft 16 being journaled in the end wall 4 and strap bearing 14 and connected to the adjacent end of the rotatable shaft 7, for supporting a gear 17. A stub shaft 18 is journaled in the end wall 4 and the strap bearing 14 above the stub shaft 16 and carries a pinion 19 that meshes with the gear 17, the outer end of the stub shaft being provided with a crank handle 20 to effect rotation thereof.

A fluid supply receptacle 21 is associated with the outer side of the opposite end wall 3, the same having a filling spout 22 and a port 23 communicating with the interior of the mixing receptacle, the door 23 being controlled by the needle valve 24 while a fluid gage 25 associated with the fluid receptacle 21 determines the quantity of fluid delivered to the mixing receptacle.

In the operation of the device, the shaft 7 is rotated through the medium of the gears 17 and 19 and the blades 10 and 13 caused to move in a circular path within the mixing receptacle, the convolutions or twisting of the blades 10 and 13 are oppositely directed and rotatable for moving the dough in the direction of the arrows A as shown in Fig. 1, the dough in addition to being raised and lowered in a circular path transverse the receptacle is also moved in a circular path, by the blades, that are substantially parallel with the longitudinal axis of the receptacle, this arrangement providing for a thorough mixing or kneading of the dough for the desired purpose. The feeding of the liquid in the fluid receptacle 21 to the mixing receptacle is controlled by a needle valve 24, while the quantity of liquid fed to the receptacle is readily determined by the graduations associated with the fluid gage 25.

While there is herein shown and described the preferred embodiment of the present invention, it is nevertheless to be understood that minor changes may be made therein without departing from the spirit and scope thereof.

What is claimed as new is:—

A dough mixer comprising a receptacle, a shaft journaled lengthwise of the receptacle, a hub secured to the shaft intermediate the ends thereof, diametrically opposite arms projecting from said hub, and formed integral therewith diametrically extending arms fixed to the opposite ends of the shaft, with the arms at opposite sides of the shaft being alined, a relatively large spiral blade journaled at its opposite ends in the outer ends of each pair of alined arms, a smaller spiral blade journaled intermediate the ends of each pair of arms, and means for rotating said shaft.

In testimony whereof I affix my signature.

DMYTRO PODHAJNY.